No. 646,774. Patented Apr. 3, 1900.
E. E. WHIPPLE.
HARROW.
(Application filed June 27, 1898.)
(No Model.) 7 Sheets—Sheet 1.
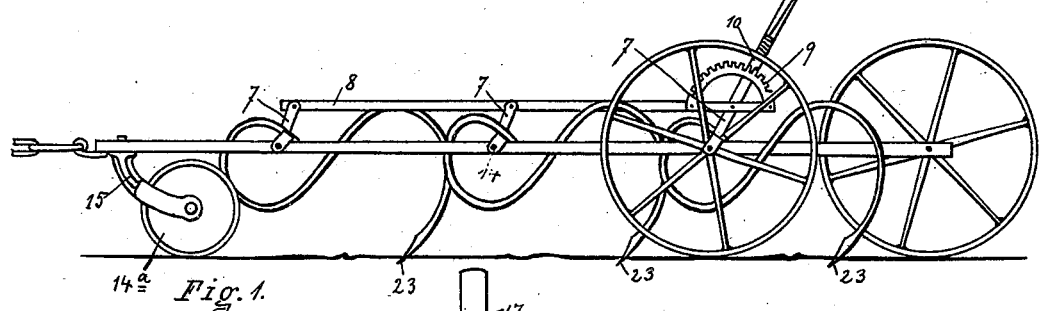
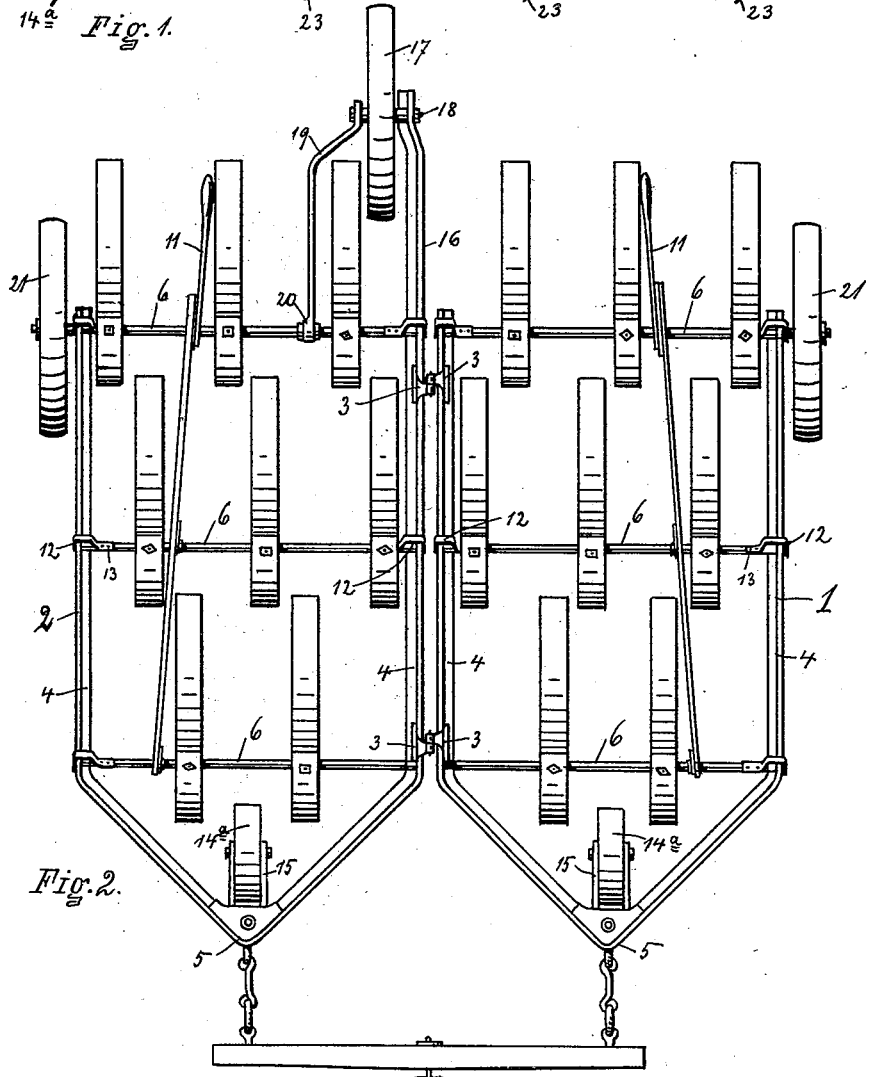
WITNESSES
Rich. A. George
Morris P. Richards
INVENTOR
EFFINGER E WHIPPLE.
By Risley & Love
ATTORNEY.

No. 646,774. Patented Apr. 3, 1900.
E. E. WHIPPLE.
HARROW.
(Application filed June 27, 1898.)
(No Model.) 2 Sheets—Sheet 2.

WITNESSES
Rich. A. George.
Morris P. Richards

INVENTOR
EFFINGER E. WHIPPLE
By Risley & Love
ATTORNEY.

UNITED STATES PATENT OFFICE.

EFFINGER E. WHIPPLE, OF UTICA, NEW YORK, ASSIGNOR, BY MESNE ASSIGNMENTS, TO THE NATIONAL HARROW COMPANY, OF JERSEY CITY, NEW JERSEY.

HARROW.

SPECIFICATION forming part of Letters Patent No. 646,774, dated April 3, 1900.

Application filed June 27, 1898. Serial No. 684,530. (No model.)

*To all whom it may concern:*

Be it known that I, EFFINGER E. WHIPPLE, a citizen of the United States of America, and a resident of Utica, Oneida county, New York, have invented certain new and useful Improvements in Harrows, of which the following is a specification.

My invention relates to an improvement in lever wheel-harrows and in an improved spring harrow-tooth and other features hereinafter pointed out and claimed.

Figure 3:
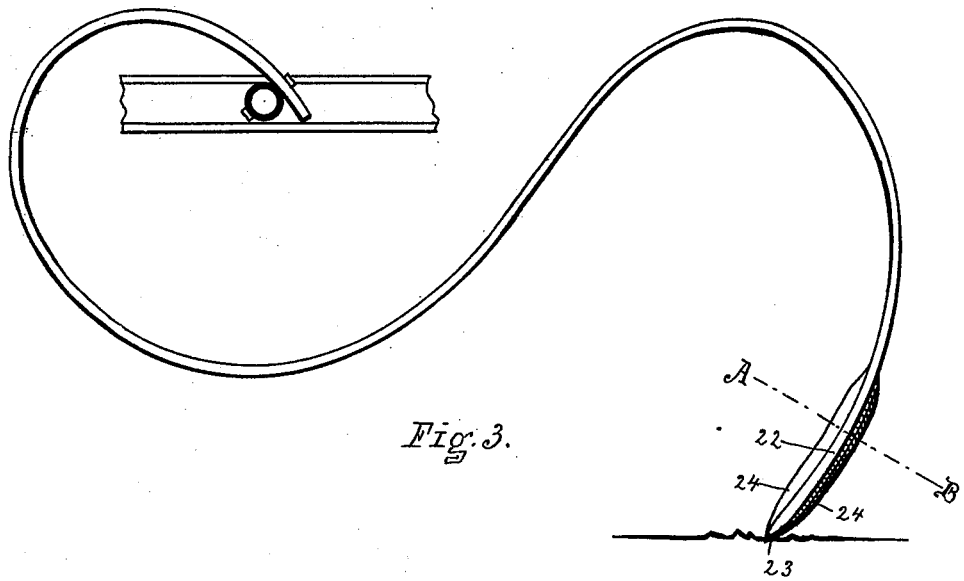
Figure 4:
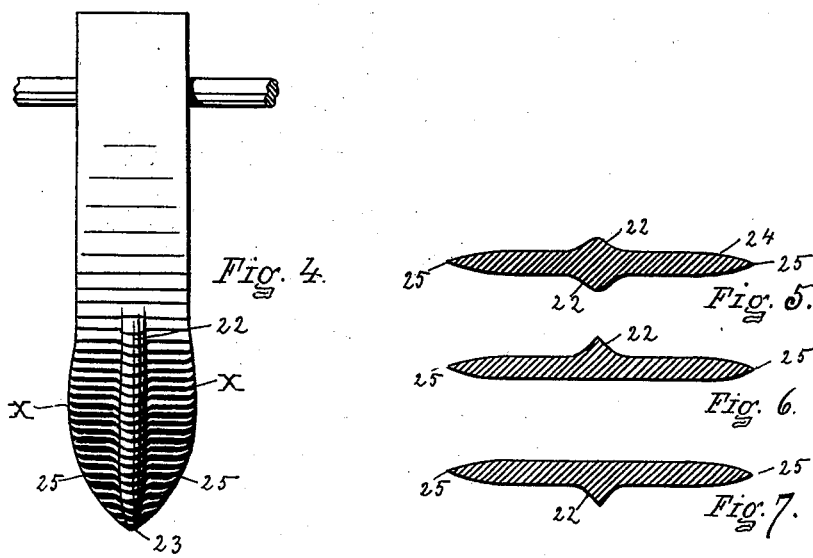
Figure 5:
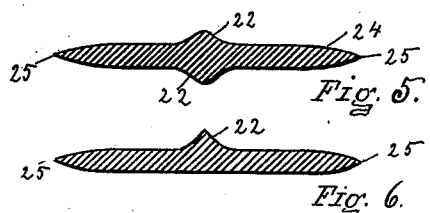
Figure 6:
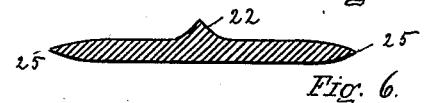
Figure 7:
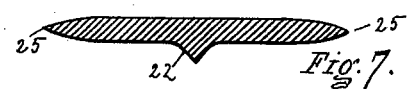

In the drawings, Figure 1 represents a side view of my improved harrow. Fig. 2 represents a top or plan view of the same. Fig. 3 represents my improved curved spring-tooth provided with a self-sharpening point attached to a section of harrow-frame. Fig. 4 is a rear view of my improved tooth. Fig. 5 is a cross-section on line A B of Fig. 3. Figs. 6 and 7 are the same as Fig. 5, showing modification in construction.

In the drawings similar numerals refer to corresponding parts in the several views.

The best form in which I have as yet embodied my invention consists in forming my harrow in sections 1 and 2, provided at their centers with hinges 3 3. Draft or frame bars 4 4 of the two sections run substantially parallel with each other throughout portions of the length of the harrow, uniting at 5 5 at the front of each section. Located between the draft-bars are a series of rocking tooth-bars 6 6, which are connected by standards 7, Fig. 1, which are secured at their lower ends rigidly to the rocking tooth-bars extending upwardly into pivotal engagement with the connecting-bar 8, Fig. 1, to which is secured ratchet-segment 9, into which the spring-actuated pawl 10, secured to the lever, operates, so that by swinging the lever 11 backward or forward the teeth are elevated or depressed at the will of the operator, so that their working points will work free from the ground or into the ground the requisite depth. The rocking tooth-bars are journaled in sockets at their ends in the side bars, the latter being held in position by a loop-clamp 12 12 at each end of the turnable tooth-bars, the clamp being riveted at 13 13 to the turnable tooth-bar and overlapping the outer edges of the draft-bar, as best illustrated at 14, Fig. 1.

The description of my invention thus far embraces the ordinary turnable tooth-bar harrow-frame and does not involve any new or novel features.

The novelty in my invention consists in supporting the hinged sections of the harrow on wheels and in the construction of the teeth. At the front of each section I provide a caster-wheel $14^a$, mounted in caster-arm 15, which is free to swing in any required direction, as the ordinary caster-wheel on furniture and like devices. I support the rear of the harrow-frame in an elevated plane above the ground by means of three wheels for each two sections of harrow. The best method that I have conceived—that of carrying the rear of the harrow in an elevated plane—is to extend one of the inner frame-bars to the rear of the harrow, as shown at 16, Fig. 2, which carries the center wheel 17, which is supported by a pivotal bolt or bearing 18, which passes through the rear of the extended frame-bar 16 and the hub of the wheel and is supported upon the opposite side by a stationary bracket 19, secured by a collar 20 on the rear tooth-bar in such manner as to permit the tooth-bar to be rotated in the collar. By this method I securely support the rear central wheel in a fixed position to always carry the frame in a given horizontal elevation above the ground. The outward rear portion of each section of the harrow is supported in an elevated plane on wheels 21 21, which in this instance are mounted on the extension-arms of the tooth-bars 6 6, which project beyond the outward faces of the draft-bars to receive the wheels, which are mounted to run freely thereon. I do not, however, limit myself in the location of these wheels, as they may be located inside of the frame-bars and accomplish precisely the same result. The central hinges between the frames carry both sections in the same elevated plane through the medium of the wheels, which carry the frame always in an elevated plane above the ground.

Another important feature of my invention consists in the construction of the tooth employed in a turnable tooth-bar harrow where the frame is carried in an elevated plane above the ground. In order to distribute more perfectly the excess of strain put upon the tooth by reason of elevating the frame, I equalize this strain by providing an S-shaped tooth with a self-sharpening point, which I will now proceed to describe. I employ flat spring-tooth harrow stock, made of steel with the requisite degree of carbon—say about forty. The metal is cut at about forty-two inches in length. It, however, may be used shorter or longer, as desired; but from practical experience it is demonstrated that a tooth forty-two inches long possesses the requisite elasticity and strength. The metal is about one and seven-eighths inches in width and about one-fourth of an inch in thickness. The teeth are formed by curving from the butt of the tooth upward, forward, downward, rearward, upward, rearward, and downward to the working point of the tooth, forming a reverse curve nearly the shape of the letter S.

The point of my improved self-sharpening tooth is made by compression, preferably by drop-hammer, by compressing the metal at the point of the tooth into a round or oblong center 22, as best illustrated in Fig. 5. This center convex rib 22 runs lengthwise of the teeth, terminating at its working point and disappearing in the flat plain surface of the tooth at about six inches above the working point. From the convex center rib of the tooth outward the metal is thin and tapering toward the opposing edges of the working point of the tooth down to substantially a sharp point, so that when the tooth is worn at its working point 23 the thin edges 24 (best illustrated at Figs. 3 and 4) are worn back by the action of the soil on the tooth. The central rib 22 having in its arrangement more metal than the outer webs of the tooth, wears less rapidly, so that the tooth will always wear on the extreme working point, and the form of the point of the tooth consisting, as before mentioned, of a convex rib through the longitudinal center of the working point will always maintain a sharp point in the tooth without the necessity of resorting to a blacksmith to point up the tooth. I accomplish the result already stated by making webs 24 24, Fig. 5, sufficiently thin to permit them to be worn with greater rapidity than the central longitudinal portion of the tooth. The metal composing the tooth-point is formed with a central longitudinally-disposed rib tapering from the rib outwardly toward the opposing edges of the tooth, being made thinner as the web recedes from the center of the tooth, the web being formed tapering from its broadest portion to the working point, the web or flange of the tooth terminating at their points in the central rib, as illustrated in Fig. 4 at 25 25. By this arrangement of the curvature in the tooth and the form and construction of the working point the harrow-frame can be elevated to any requisite height—say from nine to fifteen inches—above the ground, so as to give a complete clearance of all stone and rubbish under the harrow and the strain of the tooth be thrown forward of its attaching-point and downward and beneath the harrow-frame and equalize the strain between the attaching-butt and the working point of the tooth, so distributed as to give a degree of flexibility to the tooth and at the same time secure it rigidly to the frame-bar, so that when the lever-operative mechanism is thrown forward to throw the working point of the tooth out of the ground, the curvature of the tooth being such that it moves out and upward with greater rapidity than a tooth having a continuous curve, and thus enables the operator to free the harrow from rubbish or accumulations in the teeth with a greater degree of rapidity and at the same time furnish a tooth which has greater adaptability to sustain the strain where the frame is elevated than has heretofore been accomplished with a tooth having continuous curve from butt to point. It should, however, be borne in mind that I do not limit myself to the identical forms of parts which are illustrated in the drawings.

The central feature of my tooth-point consists in forming the working point of the tooth by broadening portions of the points and tapering the same to a single central point, which is reinforced by a rib extending from the working point backward and upward until the same terminates in the body of the tooth itself, so that there is disposed in the center of the tooth a larger quantity of the material from which the tooth is composed, which forms a continuous self-sharpening point, the web of the point being thin from the center rib to the cutting edges, so that as the point is used the web will wear faster than the center, and thus furnish a continuous self-sharpening point until the tooth is worn out.

The tooth is formed of steel and is so constructed that the metal composing the working point of the tooth is distributed and thickened along the longitudinal center of the point, the point being made tapering, and the metal on each side of the central rib is thin from the rib to the lateral edges to the point of the tooth. The centrally-disposed rib of the tooth may be made oval or on an angle.

What I claim as new, and desire to secure by Letters Patent, is—

1. In a tubular tooth-bar harrow, the combination of the hinges, the front caster-wheels, the wheels supporting the outer side of each section of the harrow-frame and a central wheel for supporting the central portions of the sections, substantially as set forth.

2. A sectional hinged turnable tooth-bar harrow in combination with depending supports for carrying the front of the frame in an elevated position above the ground, depending frame-supports on the outside of the sections of the harrow-frame for carrying the said sections of the frame above the ground, a centrally-arranged depending support extending in the rear of the central portions of the sections of the harrow-frame, and curved spring-teeth combined, substantially as set forth.

Signed by me at Utica, New York, this 1st day of June, 1898.

EFFINGER E. WHIPPLE.

Witnesses:
 RICH. A. GEORGE,
 PHEBE A. TANNER.